United States Patent [19]

Tolonen

[11] Patent Number: 5,115,988
[45] Date of Patent: May 26, 1992

[54] METHOD FOR GRINDING MATERIALS

[75] Inventor: Eric O. Tolonen, Gladwin, Mich.

[73] Assignee: Peggy E. Tolonen, Gladwin, Mich.

[21] Appl. No.: 664,210

[22] Filed: Mar. 4, 1991

Related U.S. Application Data

[63] Continuation of Ser. No. 374,258, Jun. 30, 1989, Pat. No. 4,977,137.

[51] Int. Cl.⁵ ............................................. B02C 19/22
[52] U.S. Cl. .................................................... 241/30
[58] Field of Search .......... 241/248, 260.1, DIG. 31, 241/30, 23, DIG. 38

[56] References Cited

U.S. PATENT DOCUMENTS

| | | |
|---|---|---|
| RE29,053 | 11/1976 | Cumpston, Jr. . |
| 2,524,884 | 10/1950 | Clerk . |
| 2,717,742 | 9/1955 | Weigham et al. . |
| 2,744,287 | 5/1956 | Parshall et al. . |
| 3,102,694 | 9/1963 | Frenkel ...................... 241/260.1 X |
| 3,305,183 | 2/1967 | Morden . |
| 3,323,733 | 6/1967 | Brown, Jr. . |
| 4,284,248 | 8/1981 | Adams . |
| 4,363,450 | 12/1982 | Schmidt . |
| 4,422,581 | 12/1983 | Chryst . |
| 4,576,339 | 3/1986 | Snyder et al. . |
| 4,607,796 | 8/1986 | Enikolopov et al. . |
| 4,613,087 | 9/1986 | Snyder . |
| 4,682,522 | 7/1987 | Barclay . |

FOREIGN PATENT DOCUMENTS 657845   4/1979   U.S.S.R. ......................... 241/260.1

OTHER PUBLICATIONS

"Cryopulverizing", by J. Wary and R. Davis, Chem-Tech, 1976, vol. 6, No. 3, pp. 200–203.

Primary Examiner—Mark Rosenbaum
Assistant Examiner—Willmon Fridie, Jr.
Attorney, Agent, or Firm—Harness, Dickey & Pierce

[57] ABSTRACT

A transfergrinder device for grinding a feed material. The transfergrinder device includes a grinding stator assembly and a grinding rotor assembly disposed generally axially concentric within the grinding stator assembly. The grinding stator assembly and grinding rotor assembly are maintained in generally spaced relationship from each other to define a grinding plane therebetween.

4 Claims, 3 Drawing Sheets

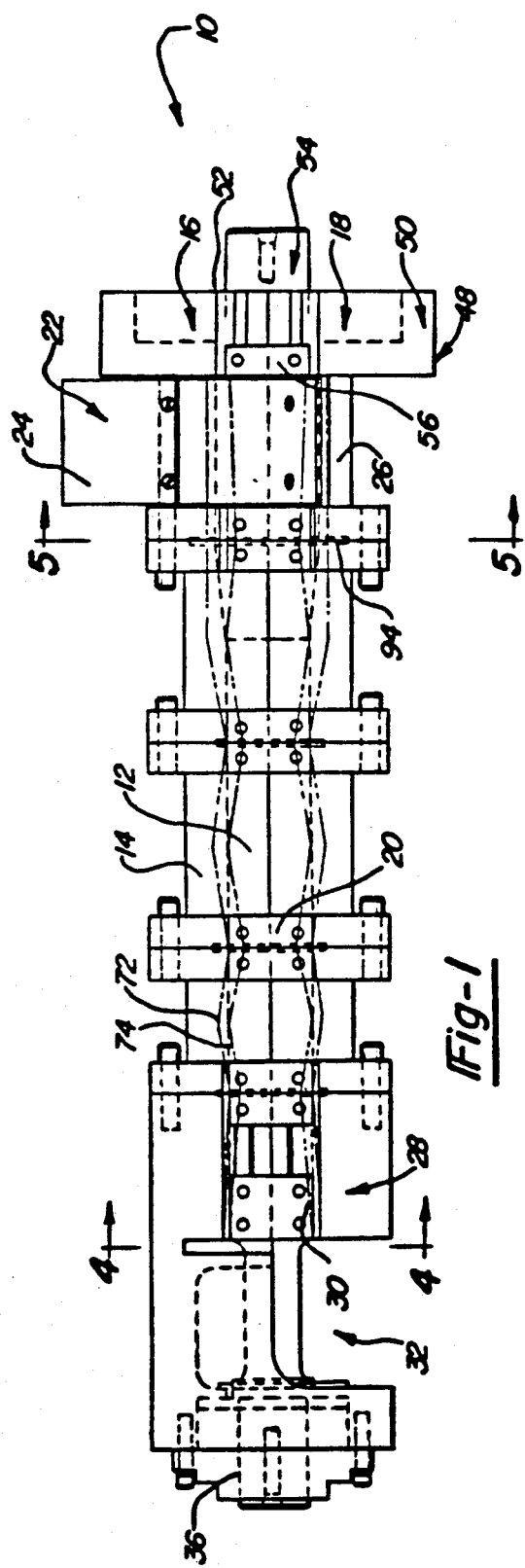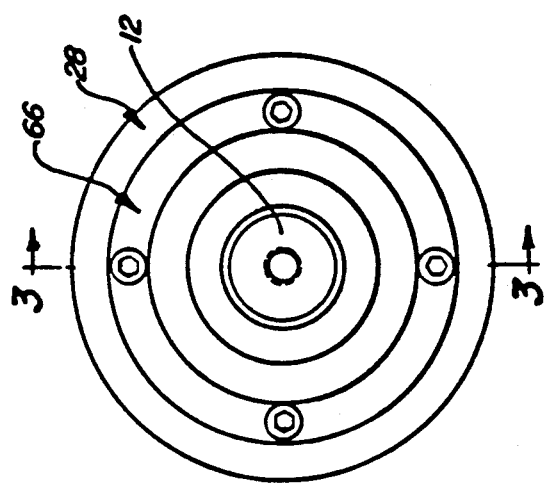

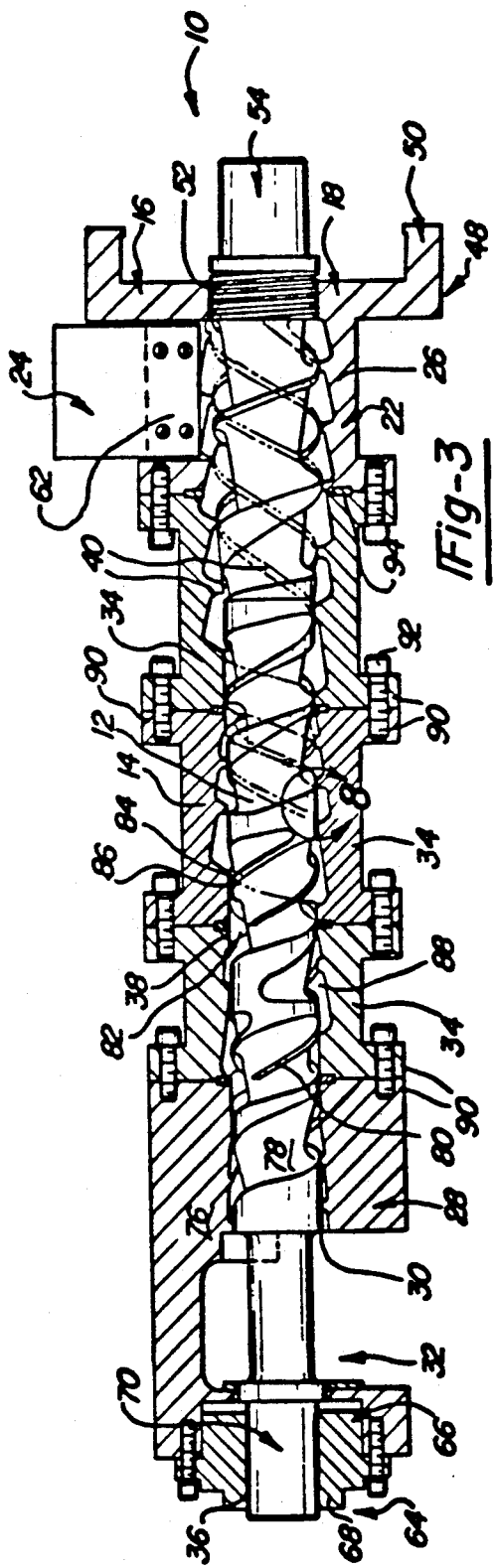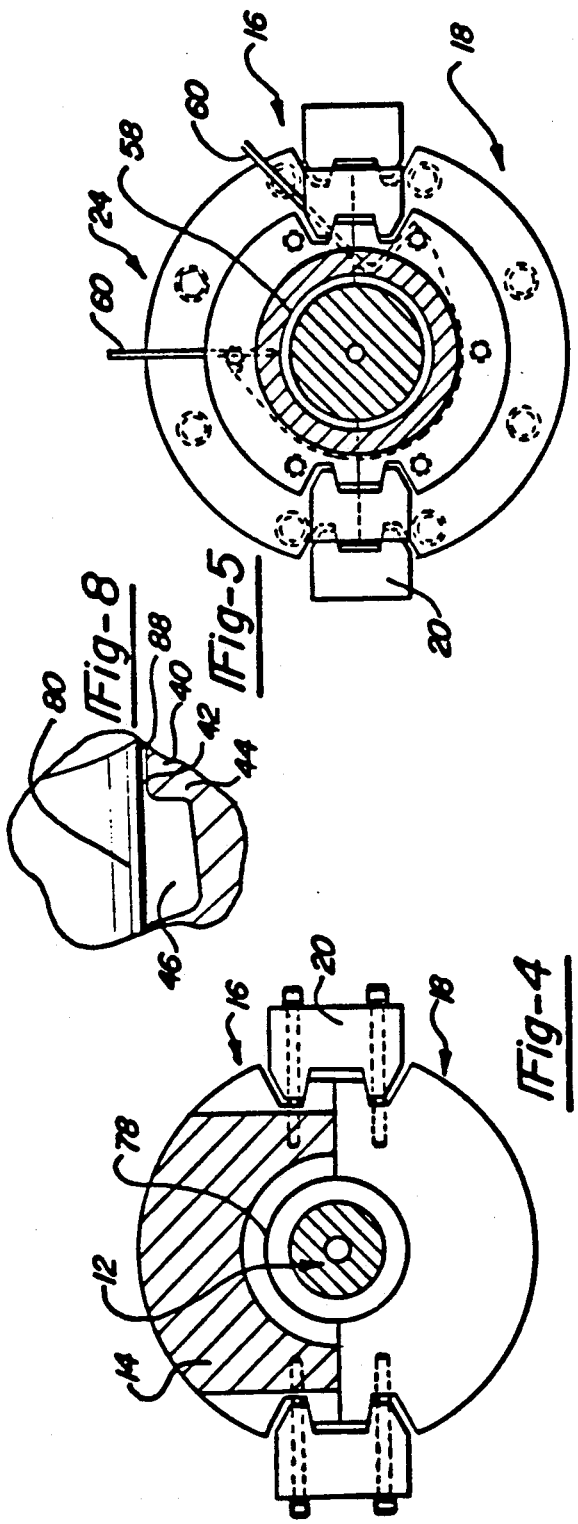

METHOD FOR GRINDING MATERIALS

This is a continuation of U.S. Patent application Ser. No. 07/374,258, filed Jun. 30, 1989 now U.S. Pat. No. 4,977,137.

TECHNICAL FIELD

This invention relates to apparatus for grinding materials, and more particularly to apparatus for grinding scrap reinforced elastomeric materials.

BACKGROUND OF THE INVENTION

Thermosetting plastic materials, including many elastomers, are generally difficult to recycle due to an inability to efficiently melt or degrade the material. Thus, to make effective use of scrap thermosetting materials, such as used vehicle tires, efforts have been made to mechanically reprocess the scrap material into a useful recycled material.

For instance, one approach to recycle materials, such as thermosetting plastic materials, is to grind, pulverize or crush the scrap materials into relatively fine particles which are suitable for re-use in tires and other applications. In this regard, the use of screw-type extrusion devices has been proposed to meet this need.

Unfortunately, with respect to many of the above known apparatus, limitations are imposed due to their construction. For instance, screw-type extrusion devices tend to simply transport significant amounts of scrap material down a screw with little or no reduction in scrap particle size or character. Thus, additional passes are necessary, which tend to decrease operating efficiency. Further, the configurations of many of the apparatus fail to readily permit the passage of relatively hard fabric or wire fragments commonly encountered in reinforced elastomeric materials, such as is found in belted tires. As a result, the relatively hard fabric or wire fragments tend to damage the grinding elements, such as the screw threads of the extrusion device, and other machine surfaces of such apparatus.

Alternatively, grinders can be used that grind scrap materials by cutting or chipping operations. However, the resulting particles tend to have smoothly cut surfaces of relatively low surface area. The particles are thus of limited useful value.

Finally, some apparatus grind scrap materials by repetitive grinding in a series of refining mills. For grinding scrap tires, these apparatus would shred tire cords into short finely dispersed filaments, which are then separable from ground scrap rubber. However, considerable difficulty in separation is commonly encountered.

As used herein, the term "transfergrinder device" refers generally to a device, of the type commonly referred to as transfermix devices, which is suitable for mixing a raw or uncured feed material. "Feed Material", as used herein, may refer to any material for which grinding is desired. In particular, the feed materials contemplated to be ground by the present transfergrinder device include plastics (particularly reinforced elastomerics), ceramics, wood or mixtures thereof. Finally, as denoted herein like reference numerals refer to like parts.

SUMMARY OF THE INVENTION

In accordance with the present invention, a transfergrinder device for grinding a feed material is disclosed. The transfergrinder device includes a grinding stator assembly, and a grinding rotor assembly disposed generally axially concentric within the grinding stator assembly. The grinding stator assembly and grinding rotor assembly are maintained in a generally spaced relationship from each other to define a grinding plane therebetween.

Among the advantages of the present transfergrinder device are that a single pass of feed material, such as a reinforced feed material, through the transfergrinder device efficiently produces a relatively large degree of separation of harde reinforcing material from relatively softer materials. The transfergrinder device thereby provides a useful and relatively efficient apparatus for grinding materials such as scrap reinforced rubber tires. The transfergrinder device is able to pass relatively large quantities of harder reinforcing materials with relatively insignificant damage to such material and to the transfergrinder device. The transfergrinder device can maintain a positive grinding pressure in a grinding plane. Also, due to the relatively efficient operation of the device, limited cooling is necessary of the rotor assembly and stator assembly to reduce particle agglomeration, such as is commonly obtained when rubber is ground.

Other objects and advantages of the invention will become apparent upon reading the following detailed description and upon reference to the drawings.

BRIEF DESCRIPTION OF DRAWINGS

FIG. 1 is an longitudinal plan view of the transfergrinder device of the present invention.

FIG. 2 is a plan view of the transfergrinder device from a downstream end of the transfergrinder device.

FIG. 3 is a longitudinal cut-away view of the transgrinder device taken through line 3—3 of FIG. 2.

FIG. 4 is a transverse cross-sectional view of the transfergrinder device and namely of a discharge assembly of the present transfergrinder device.

FIG. 5 is a transverse cross-sectional view of the transergrinder device, and namely of a hopper assembly of the present transfergrinder device taken through line 5—5 of FIG. 1.

FIG. 8 is an enlarged section from FIG. 3 that shows a spaced relationship between the rotor assembly and stator assembly of the present transfergrinder device.

DETAILED DESCRIPTION OF THE PREFERRED EMBODIMENT

Figure 6:
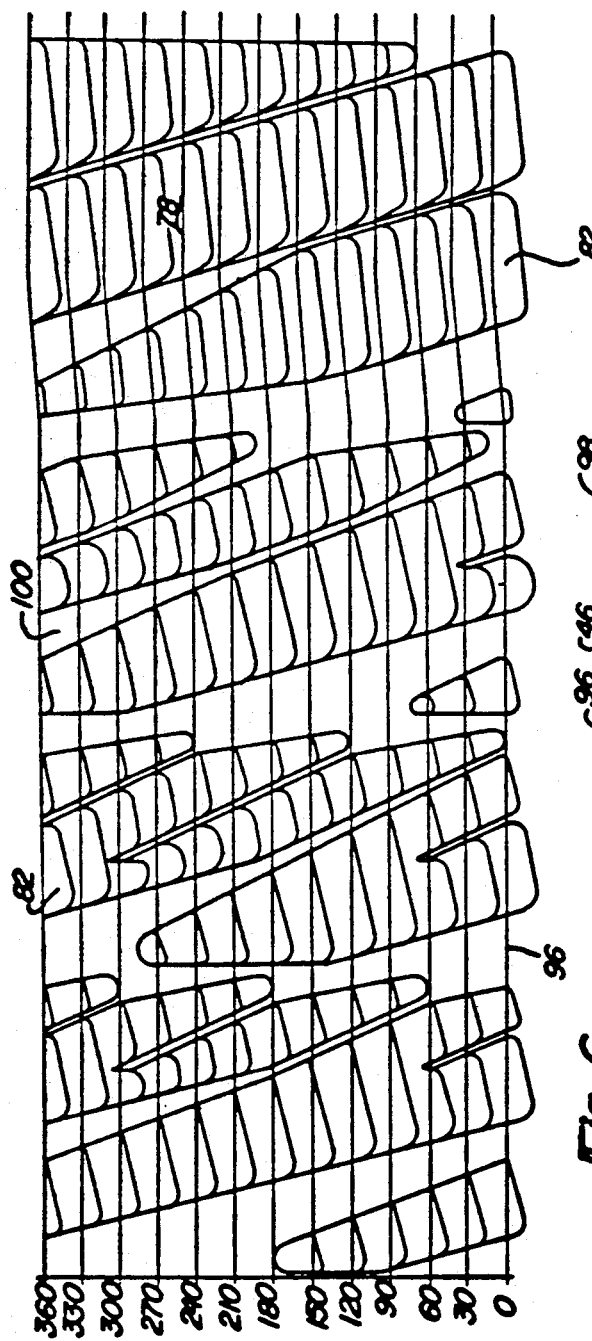
FIG. 6 is an enlarged topographical plan view of a complete rotation, laid out flat, of an exterior surface of a rotor assembly of the present transfergrinder device.

The transfergrinder device of the present invention is generally indicated by reference numeral 10 in FIGS. 1 and 3. The transfergrinder device 10 of the present invention is an extruder-like device that generally includes a rotor or screw assembly 12 disposed within a stator or barrel assembly 14. Substantially the entire stator assembly 14, in turn, is separable into an upper portion 16 and a lower portion 18 which, as shown in FIGS. 4 and 5, are generally held together by a plurality of stator keeper members 20.

Referring again to FIGS. and 3, the stator assembly 14 includes a hopper assembly 22 further including a hopper intake portion 24 and a hopper grinding portion 26; a discharge assembly 28, which is generally a grinding section with a discharge opening 30 in a hollowed-out discharge portion 32 that allows for grinding of feed material to continue substantially through to discharge of the feed material. Further, a plurality of intermediate barrel or stator elements 34 is preferably disposed between the hopper assembly 22 and the discharge assembly 28.

More particularly, the stator assembly 14, including the hopper assembly 22, the discharge assembly 28, and intermediate stator elements 34, has a bore 36 extending longitudinally therethrough for receiving and rotatably housing the rotor assembly 12. The periphery of the bore 36 is defined by an interior wall surface 38 of the stator assembly 14. The interior wall surface 38 preferably has an irregular profile, i.e. a wall surface, the longitudinal cross-sectional profile of which is generally not a continuous surface, such as is shown in FIG. 3.

More preferably, as is shown in FIG. 3, the irregular profile of the interior wall 38 has one or more stator threads 40, arranged about the interior wall 38 in a first generally helical configuration. The stator thread 40 is also depicted by phantom lines in FIG. 3. Preferably the threads are tooth-like, in that a crest or tip 42 of the threads projects away from the interior wall 38. Also the threads are generally tapered outwardly near a base 44 such as is shown in FIGS. 3, and 8. The threads are thus arranged so as to define a stator groove 46 therebetween.

As shown in FIGS. 1 and 3, in a region near the upstream end 48 of the stator assembly 14, and preferably included in the hopper grinding portion 26 of the hopper assembly 22, there is an end plate assembly 50 having an opening 52 penetrating therethrough for receiving a first end region 54 of the rotor assembly 12. The end plate assembly 50 preferably has one or more rotor keepers 56 (shown in FIG. 1). Preferably the hopper assembly 22 is adaptable for mounting to a suitable rotational driving mechanism, such as a gear box (not shown) associated with a suitable motor such as a D.C. electric motor also not shown). As is shown in FIG. 5, the hopper assembly further has an intake orifice 58, defined by a pair of spaced apart plates 60. The spaced apart plates are part of a loading guide 62, shown in FIGS. 1 and 3. The loading guide 62 is preferably in communication with a suitable source of matter-to-be-ground, i.e. feed material. The loading guide 62 ay further include a device for sweeping material toward the rotor assembly 12, such as a ram.

At a downstream end 64 of the stator assembly 14, preferably included in the discharge assembly 28, there is a discharge end plate assembly 66 which includes a suitable bearing or bushing mechanism 68 such as a piloted ASM S-2000 bearing, preferably having an opening penetrating therethrough for receiving a second end region 70 of the rotor assembly 12.

As is shown in FIGS. 1 and 3, preferably the hollowed-out discharge portion 32 penetrates a side wall 76 of the discharge assembly 28. Accordingly, after being discharged from the discharge opening 30, ground feed material may exit the transfergrinder device 10 through the hollowed-out discharge orifice portion 32.

As shown in FIG. 3, at least part of the rotor assembly 12 preferably has an exterior surface 78 with an irregular profile, and more preferably has a one or more rotor threads 80 arranged in a second generally helical configuration, so as to define a rotor groove 82 therebetween. As with that of the stator assembly, when viewed in profile, such as in FIG. 3, the rotor threads 80 are tooth-like, having a crest or tip 84 and a base 86; that is, they project away from the exterior wall surface 78 of the rotor assembly 12, and are generally tapered outwardly near their base 86. It should be noted that the surfaces defining both the stator groove 46 and the rotor groove 82 are generally smooth.

As is shown in FIGS. 1-5 and 8, the rotor assembly 12 is preferably disposed generally coaxially and substantially concentrically with the stator assembly 14, so that at least a portion f he exterior surface 78 of the rotor assembly is maintained in an opposite and a spaced relationship with the interior wall surface 38 of the stator assembly, to thereby define a grinding path 88, and thus a grinding plane, between the rotor assembly 2 and the stator assembly 14. Preferably the grinding path 88 extends substantially the entire length of the transfergrinder device, and at least a distance to include the grinding portion 26 of the hopper assembly 22, intermediate stator elements 34, and part of the discharge assembly 28. Preferably, the spacing between the rotor assembly 12 and stator assembly 14 is always maintained at a distance sufficient to facilitate the passage of relatively hard, or foreign materials through the transfergrinder device, and thus assist to minimize wear damage to the transfergrinder device. Thus in the present embodiment the spacing is at least 0.04 inches, and more preferably at least about 0.06 inches.

The hopper assembly 22, discharge assembly 28, and intermediate stator elements 34 preferably have a plurality of fittings 90 for fastening to each other, such as by a plurality of bolt fasteners 92. Further, an annular ring-shaped key 94 is placed about a periphery of the interior wall of an interface between the hopper assembly 22 or discharge assembly 28, and one or more intermediate barrel or stator elements 34. The annular ring shaped key 94, which can be made of a suitable material, assists to sealingly engage the hopper assembly 22 and the discharge assembly 28 with the intermediate stator elements 34.

It is believed that the separability of the intermediate stator elements 34 from themselves and from the hopper assembly 22 and discharge assembly 28 is a significant feature of the present transfergrinder device. First, in an alternative embodiment of the present invention, the transfergrinder device 10 of the present invention can be lengthened to provide an increased grinding path distance over which material may be ground. This can be accomplished by the addition of one or more additional intermediate stator elements 34 (of the type similar to those described above). Additionally, an extended rotor assembly (not shown) similar in structure to the above-described rotor assembly can be substituted for the above rotor assembly.

This lengthening feature permits the user to shorten or lengthen the transfergrinder device 10 of the present invention in order to vary the degree of grinding desired and to more closely regulate the ultimate size of ground particles. In this manner, transfergrinder device efficiency, including time and energy efficiency, can be improved by reducing the number of passes through the transfergrinder device that are needed for a particular grinding operation.

More significantly, however, this feature of separability of intermediate stator elements 34 permits the user to readily disassemble the present transfergrinder device for purposes including, but not limited to, general cleaning, and repairs related to feed materials that are obstructing the grinding path. This feature is particularly effective where it is necessary to reach a section of the transfergrinder device that is otherwise not easily accessible.

Figure 7:
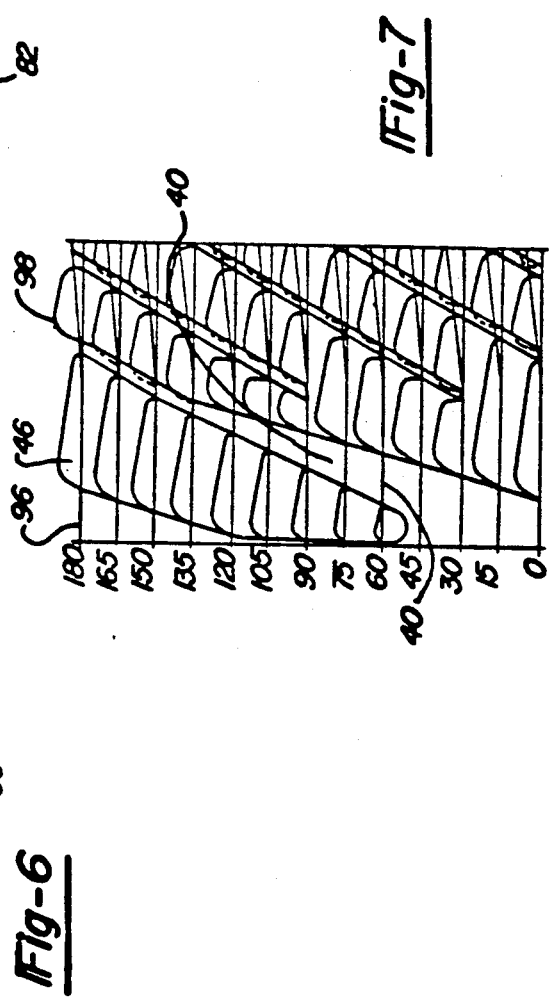
FIG. 7 is an enlarged topographical plan view showing one half of a rotation, laid out flat, of an interior wall surface of an intermediate stator element barrel of the transfergrinder device of the present invention.

Further understanding of other advantages of the present transfergrinder device and of its operation is facilitated by reference to FIGS. 6 and 7. FIGS. 6 and 7 show an enlarged topographical plan view of a highly preferred attern or the irregular surfaces of the rotor assembly 12 and stator assembly 14 depicted in FIG. 3. In particular, FIG. 6 illustrates the exterior surface 78 of the rotor assembly 12 as viewed from the grinding plane between the rotor assembly 12 and stator assembly 14, exclusive of the discharge assembly 28. FIG. 7 illustrates a section of the interior wall 38 of the stator assembly 14 of FIG. 3, as viewed from the grinding plane between the rotor assembly 12 and stator assembly 14, and corresponding substantially with the first intermediate stator element 34 adjacent to the hopper assembly 22. FIGS. 6 and 7 are not drawn to scale with respect to each other. Moreover, FIG. 6 represents a full rotation (360 degrees) of the rotor assembly, while FIG. 7 represents only half rotation of the stator assembly (180 degrees).

A plurality of generally parallel horizontal lines designated by reference numeral 96 represents a reference height from which the relative height of threads and grooves of the irregular surfaces of the rotor and stator assemblies can be represented. In FIG. 6, the lines are spaced about in a manner representative of approximately 30 degree intervals, as rotated about the longitudinal axis of the transfergrinder device. In FIG. 7 the line spacing corresponds with 15 degree intervals.

By way of example, it can be seen that for a single intermediate stator element 98 and corresponding portion of the rotor assembly 100 (both of which are generally representative of the grinding elements of the entire transfergrinder device 10, except as to variations along the length of the transfergrinder device of thread and groove dimensions), the first helical thread configuration found in the interior wall surface 38 of the intermediate stator element 98 and the second helical thread configuration found on the corresponding portion of the rotor assembly 100 are generally opposite in direction i.e. including one right-handed helix, and one left-handed helix.

Moreover depths and widths of the treads and grooves of the teeth of the rotor assembly and stator assembly vary along the length of the transfergrinder device 10 with a generally gradual decreasing tooth height (and groove depth) progressing downstream along the transfergrinder device (from right to left along FIGS. 6 and 7).

In one preferred embodiment of a transfergrinder device having a length of about six feet, a rotor assembly having a diameter of about four to about five inches is disposed within a stator assembly and spaced about 0.06 inches therefrom. The depth of the stator groove 46 ranges along the length of the stator assembly 14 from about 0.3 inches to about one inch, as measured from the thread crest 42 to about the midpoint of the stator groove. Similarly, the depth of the rotor groove 82 as measured from rotor thread crest 84 to about a mid-point of the rotor groove 82, ranges from about 0.3 inches to about one inch. Additionally, it is preferred that the depths of the rotor groove and stator groove are more shallow near the upstream end than the downstream end of the transfergrinder device. In this manner, it is believed that pressure in the corresponding grinding path is further intensified by the normal resistance to flow encountered in an extruder.

In a preferred embodiment the thread dimensions are such that transverse cross-sectional area f the discharge opening 38 is less than the transverse cross-sectional area of the grinding path 88 the latter area being taken at a distance upstream from the discharge opening 30. More preferably, the transverse cross-sectional area of the discharge opening 30 is less than the transverse cross-sectional area of the grinding path taken through the hopper grinding portion 26.

It should be noted that, in a highly preferred embodiment, the exterior surfaces of the rotor assembly 12 and of the rotor extenders 14 includes a single thread that feeds a plurality of threads at a transfer point. In this manner it is believed that additional downstream pressures upon the feed material is obtainable at such transfer points.

As represented in FIG. 1 by phantom lines 72 and 74, which generally correspond with the thread depth of the stator threads and rotor threads respectively, it is preferred that when a rotor thread 80 is at about a maximum height, a generally opposing stator thread 40 is at about a minimum height in relation to their respective grooves. Moreover, it is preferred that the transverse cross-sectional stator groove area at a particular point along the stator assembly is generally reciprocally, or inversely, related to the respective generally opposite transverse cross-sectional rotor groove area of the rotor assembly. In this manner it is believed that the threads are arranged so as to effectively advance feed material through the grinding path 88 of the transfergrinder device 10.

Further, the opposite-handed irregular surface configuration and thread and groove dimensions are such that feed material is forced from the rotor assembly and rotor extenders to the respective generally opposite stator assembly and stator extenders, and vice versa, in a shearing, smearing, and or grinding fashion. As a result, it is believed that the ed material is caused to be ground against itself in the grinding path 88. Further, because the feed material passes back and forth between right-handed and left-handed helices, it is believed that the path of the feed material changes in a substantially continuous manner, with directional changes of a flow of feed material at times being up to about 180 degrees.

By way of summary, the pattern, the lead, and the depth of the threads vary along the length of the stator assembly and rotor assembly so as to generate a positive pressure on the feed material. Thus, provided both the rotor assembly 12 and stator assembly 14 have opposite-handed helical threads (e.g. a left handed stator thread and a right handed rotor thread) the friction generated between them at the grinding surface should give the feed material a forward thrust.

As a result of the configuration of the present transfergrinder device it is believed that grinding pressures in the grinding plane, which are substantially always positive, can range from about 5 to about 1000 pounds per square inch for the embodiment of the above-listed dimensions. Accordingly, relatively efficient grinding is possible, which is further believed to provide an additional advantage of keeping the operating temperature of the transfergrinder device relatively low, i.e. preferably between about 100 degrees F. to about 300 degrees F. for a relatively long production run. The significance of this advantage is further made apparent by recognition that cooling of the transfergrinder device is generally important to minimize thermal growth of the rotor assembly and consequent constriction of the grinding path; and hat a relatively cool transfergrinder device helps to minimize the possible occurrence of burning ground material.

It is preferred that the stator assembly of the present invention, including intermediate stator elements 34, is made of a cast steel such as cast SAE 8620 steel. Alternatively, plain-carbon steel such as cast SAE 1020 steel may be used. The stator assembly 14 may optionally be surface hardened, such as by chrome plating to a depth of about 0.020 inches. On the other hand, the rotor assembly is preferably a cast and forged steel billet such as forged SAE 4140. Further, it is preferred that after forging, the rotor assembly be milled in order to finish the rotor grooves. Additionally, it is preferred that the rotor thread crests 84 are hardened, such as by applying a hard chrome tip, preferably to a depth of about 0.020 inches from an unattached end of the thread crest. Without limitation, the tip can be hardened with a material such as SAE 52100, or alternate materials such as X-alloy, or General Electric T1.

In operation of the present transfergrinder device 10, it is preferred that feed material, preferably scrap rubber tire material, is fed into the transfergrinder device 101 and particularly into the hopper assembly 22 through the hopper intake orifice 58.

Preferably, prior to such introduction into the transfergrinder device, the feed material has already been shredded or cut to a predetermined particle size, which is substantially larger than the ultimately desired particle size. The rotor assembly, which is connected preferably at the first end 36 to a suitable rotating actuator, such as a D. C. electric motor, and is rotated about its longitudinal axis at a preselected rate. The rotation rate generally varies depending on the transverse cross-sectional diameter of the rotor assembly 12, as well as factors including the feed rate of feed material, the size of particles in the feed material, and the like. For instance, and without limitation, assuming a feed material generally containing two inch square particles of shredded tire, Table I lists approximate operating speeds and top speeds of the rotor assembly at various approximate rotor assembly diameters.

TABLE I

| Rotor Assembly Diameter | Operating Speed | Top Speed |
| --- | --- | --- |
| 4¼ inches | 50-60 RPM | 90 RPM |
| 6 inches | 40-55 RPM | 70 RPM |
| 8 inches | 30-40 RPM | 52 RPM |
| 10 inches | 25-32 RPM | 40 RPM |

Grinding of the feed material thus occurs, in a manner such as described above, as the feed material is advanced through the grinding path 88 and down the length of the transfergrinder device 10. Ground feed material exits the transfergrinder device through the discharge opening 30.

The present preferred embodiment is particularly useful for grinding reinforced rubber materials (such as those reinforced with steel cords, belts, fibers of other suitable reinforcement). For instance, the transfergrinder device of the present invention is particularly useful for grinding belted vehicle tires. However, the use of this invention is not limited thereto, and may be suitable in a number of alternative environments, including the grinding of reinforced composite materials, such as plastic matrix composites, i.e. reinforced plastics. Moreover, suitable grinding compounds, i.e. compounds containing materials that are generally harder than the feed material, may also be added to the feed material to facilitate the grinding of such feed material.

It is also possible to advantageously and efficiently use the present transfergrinder device for relatively largescale separation of fiberous reinforcement material, such as steel, from surrounding softer material, such as rubber. Moreover, in instances where the feed material is not reinforced and consists of substantially homogeneous rubber or other elastomers, the transfergrinder device can effectively grind the feed material and can form a continuous stream of discharge material having a relatively uniform final dispersion of particles. Feed material that is discharged from the present transfergrinder device after grinding is useful in a number of different applications including, without limitation, tire retreading or recapping applications.

By way of example, and without intending to be limited thereby, a sample of about 130 pounds of belted tire chips, shredded to a particle size of about six square inches, is passed through the transfergrinder device. Four successive passes through the transfergrinder device are made. After the fourth pass about 81 pounds of the material is able to pass through a 3×6, hexagonal mesh screen disposed at an angle of about 40 degrees from the floor. The mesh screen has aperture dimensions of about 5/16 inch in the short direction and about 11/16 inch in the long direction.

The discharged material is characterized by a dispersion of particles much of which can pass through at least a 20 mesh sieve and some of which can pass through at least 35 meash sieve. Additionally there are present small quantities of wire, which can e readily removed using known magnetic methods, and a relatively small amount of tire cord, which can be readily removed by standard combing operations. The balance of material (that which does not pass through the wire screen and is thus separated out by such screen) consists largely of tire cord and wire filaments, much of which range in length from about one to about three inches.

Although the invention has been described with particular reference to certain preferred embodiments thereof, variations and modifications can be effected within the spirit and scope of the following claims.

What is claimed is:

1. A method for grinding a reinforced particulate material, said method comprising the steps of:
   (a) feeding said reinforced particulate material into a transfergrinder device having a grinding plane defined between the interior wall surface of a stator having a first helical thread-like configuration and the exterior wall surface of a rotor having a second helical thread-like configuration, said second helical thread-like configuration being of opposite hand relative to said first helical thread-like configuration;
   (b) maintaining a positive grinding pressure in said grinding plane;
   (c) advancing said reinforced particulate material along said grinding plane to a transfer point where a single thread feeds a plurality of threads for applying additional pressure upon said reinforced particulate material;
   (d) causing the flow of said reinforced particulate material to change direction; and (e) causing said reinforced particulate material to grind against itself.

2. The method according to claim 1, said method further comprising the step of:
(f) passing the material discharged from said transfergrinder device through a mesh sieve.

3. The method according to claim 2, said method further comprising the step of:
(g) removing said reinforcement material from said discharged material by a magnet and a comb.

4. A method for grinding a reinforced particulate material, said method comprising the steps of:
(a) feeding said reinforced particulate material into a grinding path of a transfergrinder device defined between an interior wall surface of a stator having a first helical thread-like configuration and an exterior wall surface of a rotor having a second helical thread-like configuration, said second helical thread-like configuration being of opposite hand relative to said first helical thread-like configuration;
(b) applying a positive grinding pressure along substantially the entire length of said grinding path;
(c) applying additional pressure upon said reinforced particulate material by advancing said reinforced particulate material along said grinding path to a transfer point on said rotor where a single thread feeds a plurality of threads;
(d) causing the flow of said reinforced particulate material to change direction along the length of said grinding path; and
(e) causing said reinforced particulate material to grind against itself along said grinding path.

* * * * *

UNITED STATES PATENT AND TRADEMARK OFFICE
CERTIFICATE OF CORRECTION

PATENT NO. : 5,115,988

DATED : May 26, 1992

INVENTOR(S) : Eric O. Tolonen

It is certified that error appears in the above-identified patent and that said Letters Patent is hereby corrected as shown below:

Column 2, line 12, "harde" should be --harder--.

Column 2, line 41, "transergrinder" should be --transfergrinder--.

Column 2, line 67, After "FIGS." insert --1--.

Column 3, line 28, After "FIGS. 3," insert --6--.

Column 3, line 42, Before "also", insert --(--.

Column 3, line 48, "ay" should be --may--.

Column 4, line 12, After "portion", delete "f he" and insert --of the--.

Column 4, line 16, "2" should be --12--.

Column 5, line 10, "attern" should be --pattern--.

Column 5, line 10, "or" should be --for--.

Column 5, line 48, "treads" should be --threads--.

Column 6, line 6, After "area", "f" should be --of--.

Column 6, line 42, "ed" should be --feed--.

UNITED STATES PATENT AND TRADEMARK OFFICE
CERTIFICATE OF CORRECTION

PATENT NO. : 5,115,988

DATED : May 26, 1992

INVENTOR(S) : Eric O. Tolonen

It is certified that error appears in the above-identified patent and that said Letters Patent is hereby corrected as shown below:

Column 7, line 5, "hat" should be --that--.

Column 7, line 27, "101" should be --10,--.

Column 8, line 26, "3 X 6," should be --3 X 6'--.

Column 8, line 34, "meash" should be --mesh--.

Column 8, line 35, "e" should be --be--.

Signed and Sealed this

Fourteenth Day of September, 1993

Attest:

BRUCE LEHMAN

Attesting Officer

Commissioner of Patents and Trademarks